United States Patent
Fink

(10) Patent No.: US 10,592,909 B2
(45) Date of Patent: Mar. 17, 2020

(54) APPARATUS, SYSTEM, AND METHOD FOR UNIVERSAL TRACKING SYSTEM

(71) Applicant: SaverKey International, Inc., Salt Lake City, UT (US)

(72) Inventor: Alan W. Fink, Salt Lake City, UT (US)

(73) Assignee: Saverkey International, Inc., Salt Lake City, UT (US)

( * ) Notice: Subject to any disclaimer, the term of this patent is extended or adjusted under 35 U.S.C. 154(b) by 206 days.

(21) Appl. No.: 13/651,185

(22) Filed: Oct. 12, 2012

(65) Prior Publication Data

US 2013/0097004 A1 Apr. 18, 2013

Related U.S. Application Data

(60) Provisional application No. 61/546,449, filed on Oct. 12, 2011.

(51) Int. Cl.
*G06Q 30/02* (2012.01)
(52) U.S. Cl.
CPC .................................. *G06Q 30/02* (2013.01)
(58) Field of Classification Search
CPC .................................................... G06Q 30/02
USPC ............... 705/14.3, 14.28, 14.12, 65, 14.23; 713/189; 345/173; 706/20; 707/802; 601/49; 709/224
See application file for complete search history.

(56) References Cited

U.S. PATENT DOCUMENTS

| | | | |
|---|---|---|---|
| 6,236,981 B1 | 5/2001 | Hill | |
| 6,748,367 B1 | 6/2004 | Lee | |
| 6,829,586 B2 | 12/2004 | Postrel | |
| 7,398,225 B2 | 7/2008 | Voltmer et al. | |
| 8,121,917 B2 | 2/2012 | Insolia et al. | |
| 8,195,507 B2 | 6/2012 | Postrel | |
| 8,214,299 B2 | 7/2012 | Bishop et al. | |
| 8,265,993 B2 | 9/2012 | Chien et al. | |
| 2002/0095387 A1* | 7/2002 | Sosa | G06Q 20/04 705/65 |

(Continued)

FOREIGN PATENT DOCUMENTS

| | | |
|---|---|---|
| KR | 1020060082012 | 7/2006 |
| KR | 100756439 B1 * | 9/2007 |

OTHER PUBLICATIONS

Ashraf Tahat, Android based universal vehicle diagnostic and tracking system, 2012 (Year: 2012).*

(Continued)

*Primary Examiner* — Tarek Elchanti
(74) *Attorney, Agent, or Firm* — Kunzler Bean & Adamson

(57) ABSTRACT

An apparatus, system, and method are disclosed for a universal tracking system. A token module is configured to create a universal tracking token without requiring a user to provide any prerequisites. The universal tracking token is associated with a user by a unique identifier. A user account module is configured to store data associated with a user. The user data includes data associated with one or more universal tracking tokens. The user account is defined as either a merchant or key holder account. Further, a relationship module is configured to maintain a one-to-many relationship between the user account and a plurality of either merchant or key holder accounts. Relationship data is also collected and stored in a database.

24 Claims, 20 Drawing Sheets

(56) References Cited

U.S. PATENT DOCUMENTS

| | | | |
|---|---|---|---|
| 2003/0052864 A1* | 3/2003 | Sert | G06Q 30/02 |
| | | | 345/173 |
| 2004/0139008 A1 | 7/2004 | Mascavage | |
| 2006/0212407 A1 | 9/2006 | Lyon | |
| 2006/0224454 A1 | 10/2006 | Kantor et al. | |
| 2007/0239639 A1* | 10/2007 | Loughmiller | G06Q 10/107 |
| | | | 706/20 |
| 2007/0265554 A1* | 11/2007 | Brusca | 601/49 |
| 2009/0307069 A1* | 12/2009 | Meyerhofer | A63F 3/08 |
| | | | 705/14.12 |
| 2010/0065629 A1 | 3/2010 | Wentker et al. | |
| 2010/0174596 A1* | 7/2010 | Gilman | G06Q 20/387 |
| | | | 705/14.23 |
| 2011/0166992 A1* | 7/2011 | Dessert et al. | 705/39 |
| 2011/0282915 A1* | 11/2011 | Steer | H04L 63/06 |
| | | | 707/802 |
| 2012/0130536 A1 | 5/2012 | Canter et al. | |
| 2012/0253914 A1* | 10/2012 | Black | G06Q 30/02 |
| | | | 705/14.28 |
| 2012/0324242 A1* | 12/2012 | Kirsch | G06Q 20/0855 |
| | | | 713/189 |

OTHER PUBLICATIONS

PCT/US2012/060097 International Search Report and Written Opinion dated Mar. 28, 2013.
EP12840016, Supplementary European Search Report, dated Feb. 17, 2015.

* cited by examiner

APPARATUS, SYSTEM, AND METHOD FOR UNIVERSAL TRACKING SYSTEM

CROSS-REFERENCES TO RELATED APPLICATIONS

This application claims the benefit of U.S. Provisional Patent Application No. 61/546,449 entitled "UNIVERSAL TRACKING SYSTEM" and filed on Oct. 12, 2011 for Alan W. Fink, which is incorporated herein by reference.

FIELD

This invention relates to customer loyalty programs and more particularly to customizing the collection and management of consumer data to improve the relationship between a consumer and retailer.

BACKGROUND

Traditional customer loyalty programs provide a tracking system specifically designed to monitor customer activity ("the Trackee") for a single retailer ("the Trackor"). These systems are beneficial because they provide the Trackor with data regarding the activity of the Trackee, which helps the Trackor better understand the effectiveness of their marketing and advertising campaigns. A drawback to these one-sided "closed systems" is that they are designed to benefit the Trackor with very little direct benefit to the Trackee(s). The Trackee has little or no control over their relationship with the Trackor.

Another drawback to the traditional systems is that they are expensive to implement because they require a sophisticated infrastructure that includes, at a minimum, specialized databases and analytical tools. Even with the correct infrastructure, however, the collected data is still incomplete. Due to difficulties with logistics, data collection, data entry, and Trackee privacy concerns, the Trackor is not able to collect a complete set of data for a Trackee. Consequently, the Trackor cannot use the data to provide targeted marketing and advertising campaigns because the Trackor may not know who they are tracking.

SUMMARY

From the foregoing discussion, it should be apparent that a need exists for an apparatus, system, and method that provide a Trackee driven universal tracking system. Beneficially, such an apparatus, system, and method would be available to various types of Trackors (businesses, churches, individuals, etc.) and Trackees, provide a two-sided, opt-in relationship driven system, provide valuable data describing a Trackor/Trackee relationship, and provide greater privacy control to a Trackee.

The present invention has been developed in response to the present state of the art, and in particular, in response to the problems and needs in the art that have not yet been fully solved by currently available tracking systems. Accordingly, the present invention has been developed to provide an apparatus, system, and method for a Trackee driven tracking system that overcome many or all of the above-discussed shortcomings in the art.

The universal tracking apparatus is provided with a plurality of modules configured to functionally execute the necessary steps of tracking a relationship between a merchant (Trackor) and a key holder (Trackee). These modules in the described embodiments include a token module configured to create a universal tracking token without requiring a user to provide any prerequisites. In one embodiment, the universal tracking token is associated with a user by a unique identifier. A user account module, in one embodiment, is configured to store data associated with a user, which may also include data associated with one or more universal tracking tokens. The user account may be created as either a merchant or a key holder account. Moreover, a relationship module, in one embodiment, is configured to maintain a one-to-many relationship between the user account and a plurality of merchant and key holder accounts. The relationship module, in further embodiments, also collects and stores relationship data in a database.

The apparatus, in one embodiment, is configured to detect the presence of a universal tracking token during a transaction between a key holder and a merchant, which updates the visit history data for merchant. Moreover, in a further embodiment, a token visit event module monitors a database to determine if a key holder has visited a merchant within a specified time period, and, if not, will take a retention action to persuade the key holder to visit the merchant again. Further, the relationship module, in one embodiment, includes a settings module that is configured to maintain account access preferences for one or more merchant and key holder accounts. The settings module, in certain embodiments, is further configured to provide communications through masked services that are only defined and understood by the tracking system. The masked communication services, in one embodiment, verify communications with a known sender list such that unknown senders are filtered-out and their messages discarded. The settings module, in other embodiments, allows a user to set privacy settings, restricting a merchant or key holder from viewing certain information of the other party in a relationship. Further, each party to a relationship has control over their participation in the relationship, such that either party may end the relationship, or alter the terms of the relationship, at any time.

The relationship module, in one embodiment, also maintains a personal directory of favorite entities, such as businesses, and updates the directory when a key holder visits a merchant. Additionally, in one embodiment, the relationship module aggregates and reports general relationship data, regardless the privacy settings of the user accounts. In another embodiment, the relationship module manages shared relationship data, which may be viewed by both parties in a relationship, with access limitations defined by the parties' privacy settings. In another embodiment, merchant accounts may be classified as either a parent or child account, where the parent account controls certain settings of its children.

In one embodiment, the token module tracking identifier is stored in a compressed format. In another embodiment, the user account module creates an empty tracking account, which may be defined further as transaction activity occurs in the relationship. In other embodiments, the user account module creates an anonymous tracking account when an anonymous token visit event occurs. The anonymous tracking account, in one embodiment, may subsequently be assigned to a specific user.

In one embodiment, a points module is configured to aggregate and manage a key holder's universally accepted loyalty points that are acquired by transacting with merchants. Further, in one embodiment, a cashless processing module is configured to link a cashless payment account with a user account such that the cashless payment is accepted for goods and services at various merchants. A user authorizes cashless payments, in one embodiment, by providing a PIN.

Further, a digital business card module is provided, which shares business contact information between parties in a relationship. The business contact information, in one embodiment, is retrievable by presenting a tracking token to an interested party, which may also automatically create a relationship between two previously unrelated entities. In one embodiment, privacy settings controlling access to the business information may be overridden at the time the information is requested.

Also provided is an interactive advertising module configured to visually present dynamic, interactive advertising content on a terminal. In one embodiment, the interactive advertising content is derived from advertising campaigns or schedules. In another embodiment, the terminals may be managed in user-defined groups. The terminals, in other embodiments, also collect and store user data in a local database, which may later be sent to a central server through a reliable network.

A method of the present invention is also presented for a universal tracking system. The method in the disclosed embodiments substantially includes the steps necessary to carry out the functions presented with respect to the operation of the described apparatus and system. In one embodiment, the method includes creating a universal tracking token without requiring a user to provide any prerequisites. The method also may include creating a user account to store data associated with a user, which may include data associated with one or more universal tracking tokens. In one embodiment, the user account may be defined as either a merchant or key holder account. In a further embodiment, the method includes maintaining a one-to-many relationship between the user account and a plurality of merchant and key holder accounts. Data describing the relationship may also be collect and stored in a database.

In one embodiment, the method detects the presence of a universal tracking token during a transaction. A visit history log may be updated when the key holder visits the merchant and presents its tracking token. In another embodiment, masked communications are provided to a user and also a filtering process that verifies whether a message is from a known sender. Additionally, the method, in one embodiment, aggregates and manages a key holder's loyalty points and allows a user to link a cashless payment account to their user account.

A computer program product of the present invention is also presented to provide a universal tracking system. The system, in one embodiment, creates a universal tracking token without requiring a user to provide any prerequisites. In one embodiment, the universal tracking token is associated with a user by a unique identifier. In one embodiment, the computer program product stores data associated with a user, which may also include data associated with one or more universal tracking tokens. The user account may be created as either a merchant or a key holder account. Moreover, the computer program product maintains a one-to-many relationship between the user account and a plurality of merchant and key holder accounts and also collects data describing the relationship and stores it in a database.

In one embodiment, the computer program product detects the presence of a universal tracking token during a transaction. A visit history log may be updated when the key holder visits the merchant and presents its tracking token. In another embodiment, masked communications are provided to a user and also a filtering process that verifies whether a message is from a known sender. Additionally, the computer program product, in one embodiment, aggregates and manages a key holder's loyalty points and allows a user to link a cashless payment account to their user account.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
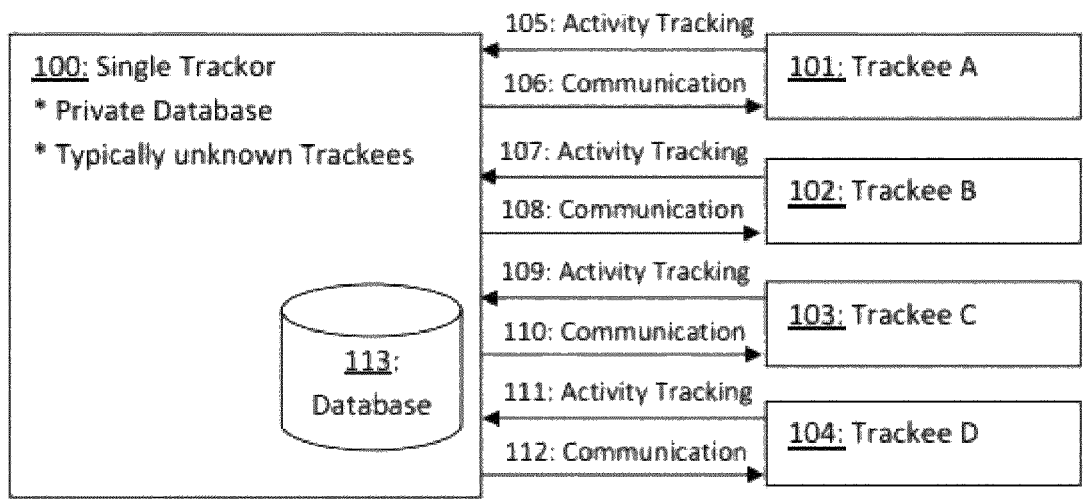
FIG. 1 is a schematic block diagram illustrating one embodiment of a tracking system described in the prior art.

FIG. 1 depicts one embodiment of a traditional tracking system described in the prior art. A single Trackor 100 provides a tracking token to its Trackees 101, 102, 103, and 104. As the Trackees make purchases, the activity is tracked 105, 107, 109, 111 and stored in a database 113, which is only available to the Trackor 100. The Trackor 100 uses the tracking data to communicate 106, 108, 110, 112 with its Trackees through marketing or advertising campaigns. In a typical tracking system, the Trackee has very limited control or access over their relationship with the Trackor 100. Even if such functionality is provided, the Trackee is typically a permanent component of the Trackor's 100 database 113, which is under exclusive control of the Trackor 100.

Figure 2:
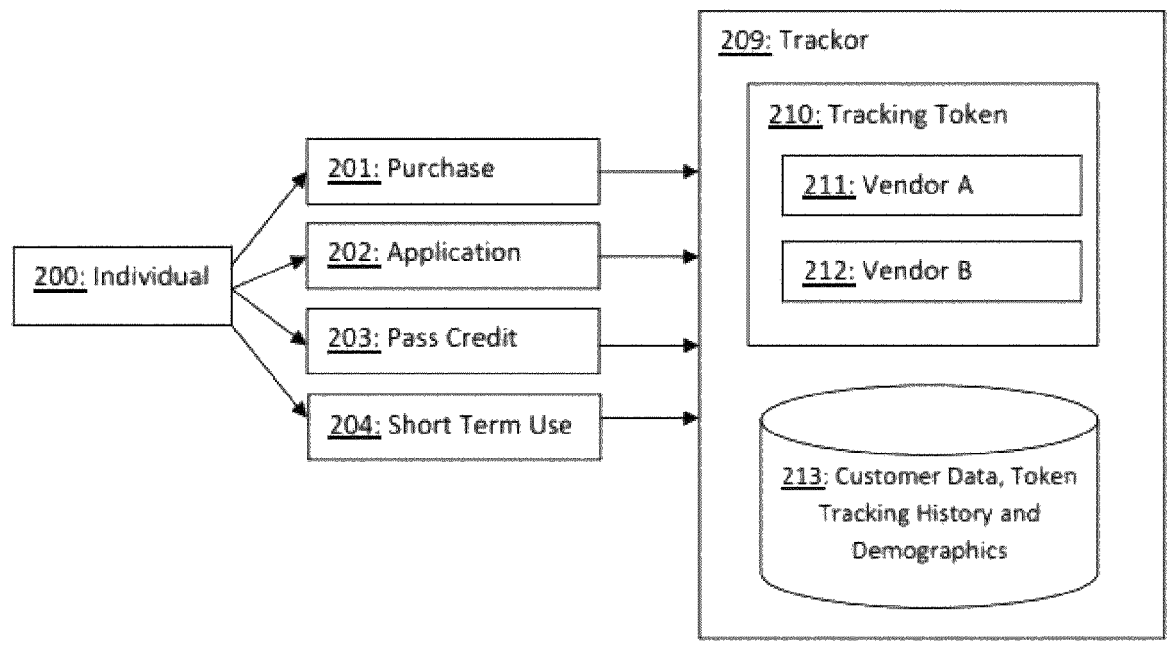
FIG. 2 is a schematic block diagram illustrating one embodiment of acquiring a token in a tracking system described in the prior art.

FIG. 2 illustrates the typical limitations and drawbacks required in traditional systems for an individual 200 to acquire and use a tracking token 210. The first and most common limitation is the requirement that tokens 210 be assigned to a single Trackor 209. Even in systems where multiple vendors 211, 212, receive benefits from a single Trackor 209, the vendors have little to no access to demographic data, tracking history, contact information, or like data stored in the database 213. Other restrictions, such as the required purchase 201, application 202, creditworthiness 203, and short-term use 204, further limit the ubiquity of traditional systems.

Figure 3A:
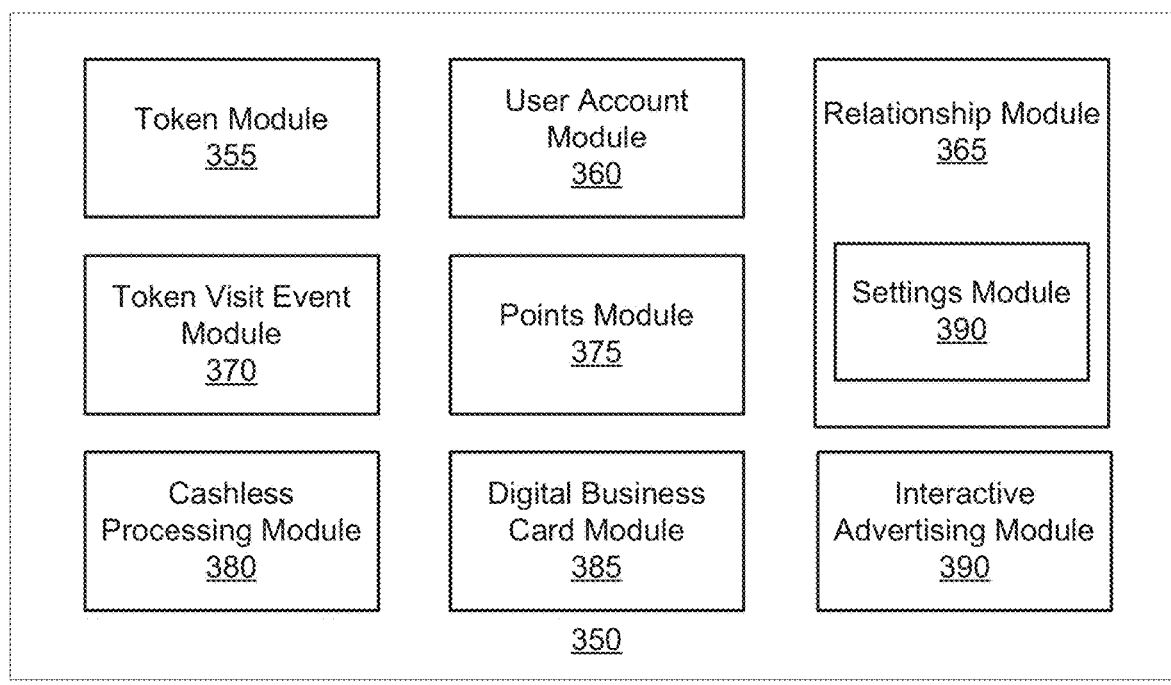
FIG. 3A is a schematic block diagram illustrating one embodiment of an apparatus in accordance with the present subject matter.

FIG. 3A is a schematic block diagram illustrating one embodiment of an apparatus 350 for a universal tracking system. The apparatus 350 includes a token module 355, a user account module 360, a relationship module 365, a token visit event module 370, a points module 375, a cashless processing module 380, a digital business card module 385, and an interactive advertising module 390, which are described below.

Figure 3B:
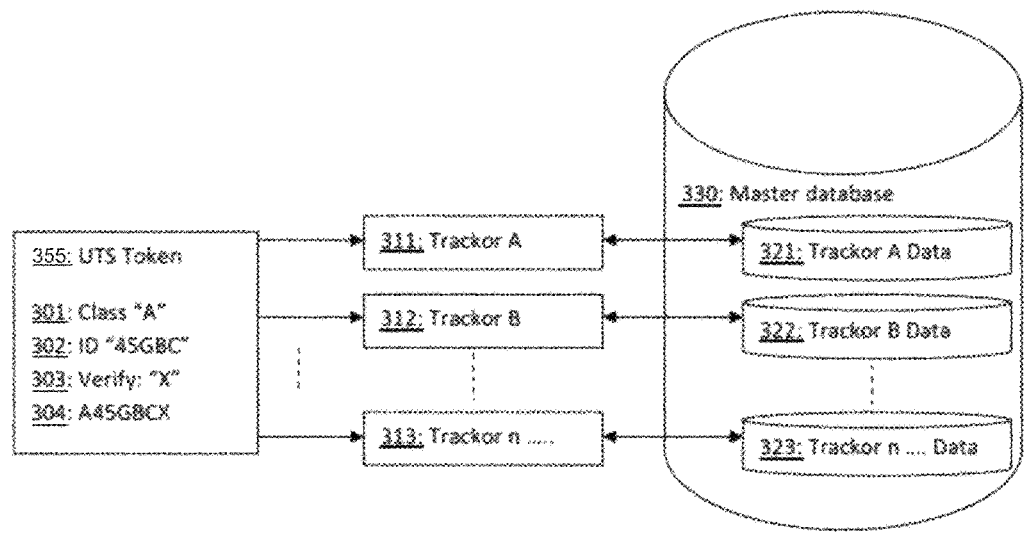
FIG. 3B is a schematic block diagram illustrating one embodiment of a tracker token in accordance with the present subject matter.

FIG. 3B illustrates one embodiment of a universal tracking system ("UTS") token module 355 of the present subject matter. The token module 355, in one embodiment, may include a UTS token, which is an unidentified, arbitrary tracking identifier available to any individual, entity, or product without any prerequisite for its use. In one embodiment, the tracking token may be linked to any number of other tracking tokens, as described below with reference to the relationship module 365. Any set of tracking tokens, in one embodiment, may be classified into various groups to be treated as a collection of tokens, which allows group level settings to be applied to a collection of tokens, such as access levels, privileges, messaging settings, and the like.

In one embodiment, the token module 355 may not require the restrictions of traditional tracking systems, such as an application or creditworthiness. In another embodiment, the token module 355 may not require any form of preference, such as age or sex. Furthermore, in one embodiment, the UTS token may be tracked by any number of Trackors 311, 312, 313, each of which may have access to an assigned database 321, 322, 323 that is a subset of a master database management system 330. Each Trackor 311, 312, 313 may have access to Trackee data stored in its assigned database 321, 322, 323, such as histories, contact information, demographics, and the like. As used herein, a Trackor entity may be a vendor, merchant, or the like and a Trackee may be a vendee, customer, consumer, key holder, or the like.

The token module 355, in one embodiment, may include an exclusive identification format that uniquely identifies the UTS token such that use of the system is limited to authorized users. The identification format may be a compressed format 304, in one embodiment, which may include a class identifier 301, an encrypted numerical value 302, and an alpha-numeric verification value 303 to verify the validity of the UTS token. Each UTS token may be defined and validated with the master database management system 330. In one embodiment, the compressed identification format 304 may store over four billion unique UTS tokens, including class and verification parameters, within a string of at most ten characters.

Referring to FIG. 3A, in one embodiment, the user account module 360 may be configured to store data associated with one or more UTS tokens. In certain embodiments, user accounts may be created as a Trackor account, a Trackee account, or both. The relationship module 365, in one embodiment, may maintain a one-to-many relationship between various accounts created by the user accounts module 360. The relationship module 365, in a further embodiment, may collect data describing the relationship between Trackors and Trackees and store the data in a database. Shared components of the data, such as activity logs and status levels, may be visible to both Trackor and Trackee user accounts. On the other hand, in one embodiment, a party may submit one-sided data, such as notes, that may never be disclosed to the other party regardless the privacy settings of the parties. Additionally, in one embodiment, aggregated data, such as sex, age, interests, or the like, may be visible to a Trackor, regardless the privacy settings of the parties, while the Trackee contact data remains hidden from the Trackor. These relationship settings, however, may be customized by the settings module 390, described below.

Furthermore, the relationship module 365, in some embodiments, may allow a Trackor to manage subscription services for any Trackee. Subscription services, in one embodiment, may include managing subscription account information, collecting payments, settings terms, and the like. The subscription service may also allow a Trackor, or another third party, to validate subscription services by checking with the tracking system for the existence of a subscription for one or more Trackees. The relationship module, in other embodiments, also maintains a private relationship directory between Trackors and Trackees such that each user of the tracking system can see other users in the system. This allows a user to create a "personal yellow pages" directory of favorite businesses or friends. In one embodiment, the relationship module 365 adds a Trackor or Trackee to the personal directory when a Trackee presents tracking token to a Trackor, who may scan the token to enter the visit in the UTS. A relationship maintained by the relationship module 365, in one embodiment, may be deleted by either party in a relationship at any point in the relationship, which gives the Trackee equal level of control in their relationship with a Trackor. Alternatively, in a further embodiment, either party has equal control to alter the terms of the relationship.

The token visit event module 370, in one embodiment, may be configured to detect the presence of a universal tracking token during a Trackor-Trackee transaction and may update a Trackor visit history when a unique token visit is detected. The token visit event module is further described below in reference to FIGS. 4-6. The points module, as described below with reference to FIG. 15, may be configured to aggregate and manage a Trackee's loyalty points, which may be acquired and redeemed at various Trackors.

The cashless processing module 380, in one embodiment, allows a user to link their user account to a cashless payment account, such as a credit card account, cash deposit account, and the like, to make cashless payments at one or more Trackors. The module 380, in one embodiment, may require the user to select a PIN when the cashless account is linked, which may later be required to be presented by the user to authorize and confirm payment using their cashless account. The user's PIN, in some embodiments, may be changed at any time through the UTS website or a separate mobile application. Additionally, in other embodiments, the user may add, delete, or change cashless payment accounts through the UTS website or mobile application.

The digital business card module 385, in one embodiment, allows Trackors and Trackees to easily share their business information with each other. For example, a Trackee may have an identification badge with a bar code printed on it that contains information regarding the Trackee's user account and token data. A Trackor may scan the bar code, which would display the Trackee's business information on a terminal or other electronic device. Moreover, a relationship between the parties may be automatically created, including sending each party a copy of the digital business card, sharing notes, and classifying the parties into predefined groups. A Trackor or Trackee, in one embodiment, may control access to their information by customizing privacy settings for their user accounts. The privacy settings, in one embodiment, however, may be overridden by the user being scanned by entering their PIN on the scanner display and changing their privacy settings in their user account.

The interactive advertising module 390, in one embodiment, may present to the user dynamic, interactive advertising content on point-of-sale terminals. The point-of-sale terminals, in some embodiments, may be capable of collecting transaction and user data, which may be stored in a local database. In one embodiment, when a reliable network connection is available, the data may be sent from the local database to a central database. In another embodiment, the point-of-sale terminals may be classified and managed in user-defined groups. For example, all terminals in a western region may be grouped together such that as advertising content changes in a region for a Trackor, all terminals within that region may be quickly updated with the new advertising content, providing a user with the ability to create regional-targeted advertising campaigns. The interactive advertising module 390, in a further embodiment, allows a user to quickly change advertising schedules and/or campaigns through a website or mobile application.

The interactive advertising device, such as a point-of-sale terminal, in one embodiment, may present an interactive, multimedia site comprising rich internet application technologies, such as Flash, HTML5, or the like. For example, Flash objects defining predefined advertising campaigns and/or schedules may be downloaded in the background by a program written in an event-driven programming language, such as Visual Basic, JavaScript, PHP, or the like, and then presented to the user through a Flash-based front end. The Flash object manager receives input, such as a keyboard scan, and passes the input data to the backend program to be processed to be stored, transmitted, or the like.

Figure 4:
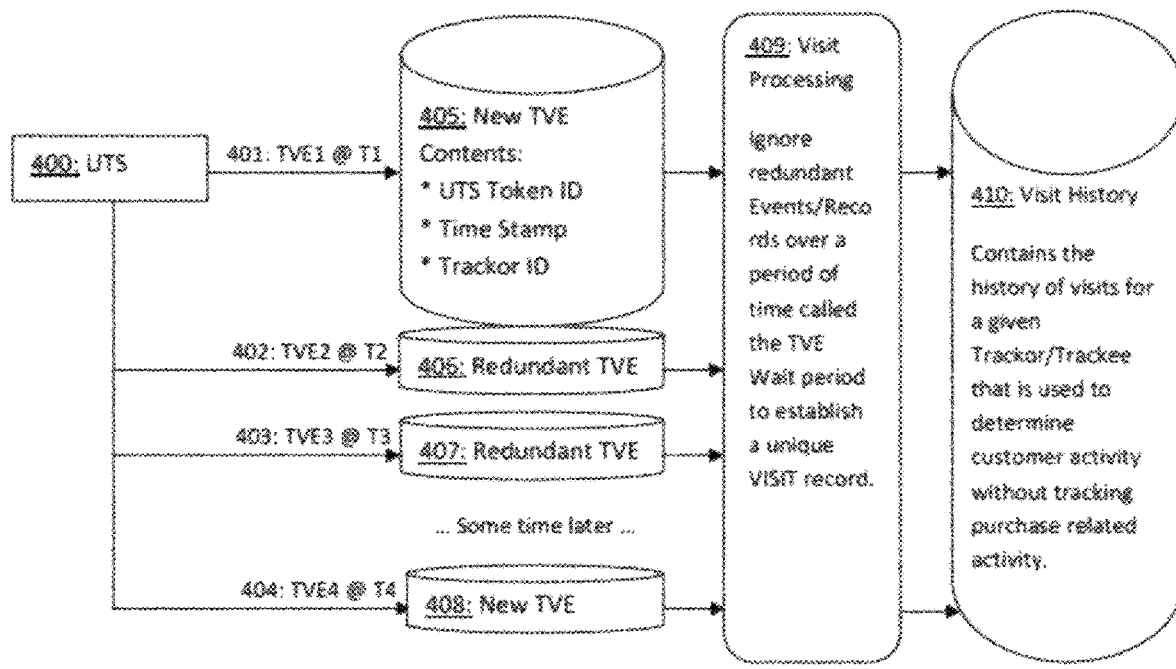
FIG. 4 is a schematic block diagram illustrating one embodiment of a token event in accordance with the present subject matter.

FIG. 4 depicts one embodiment of a UTS token visit event ("TVE") module 370. Unlike traditional tracking systems, which require additional tracking parameters, such as the purchase price, items purchased, redemption value, and the like, the TVE does not require any such parameters. A TVE 405, in one embodiment, may only contain basic elements such as the UTS token 400, the time the record was created, and a Trackor identifier to indicate who or what recorded the event. In one embodiment, creation of a new TVE 405, 408 may not imply that any specific activity or purchase occurred, but only implies that the UTS token 400 was present at a given time for a given Trackor.

In one embodiment, the TVE may pass through a secondary filtering process 409 to determine if the record is redundant. Any subsequent records recorded during a TVE wait period, in one embodiment, are ignored, resulting in a single database record describing a unique "visit" during that TVE wait period. For example, FIG. 4 depicts four TVE's 401, 402, 403, 404 recorded at times T1, T2, T3, and T4. Assuming that the visit wait period is greater than the difference between times T3 and T1, but less than the difference between times T4 and T1, both TVE2 402 and TVE3 403 would be determined to be redundant and discarded. Thus, only TVE1 401 at time T1 and TVE4 404 at time T4 would be recorded in the visit history database 410. In one embodiment, the visit history database 410 may subsequently be used to determine TVE/visit history and, ultimately, a ranking of the Trackor's Trackees in comparison to each other. Therefore, the Trackor may not rely on any specific activity other than the presence of the UTS token 400.

Figure 5:
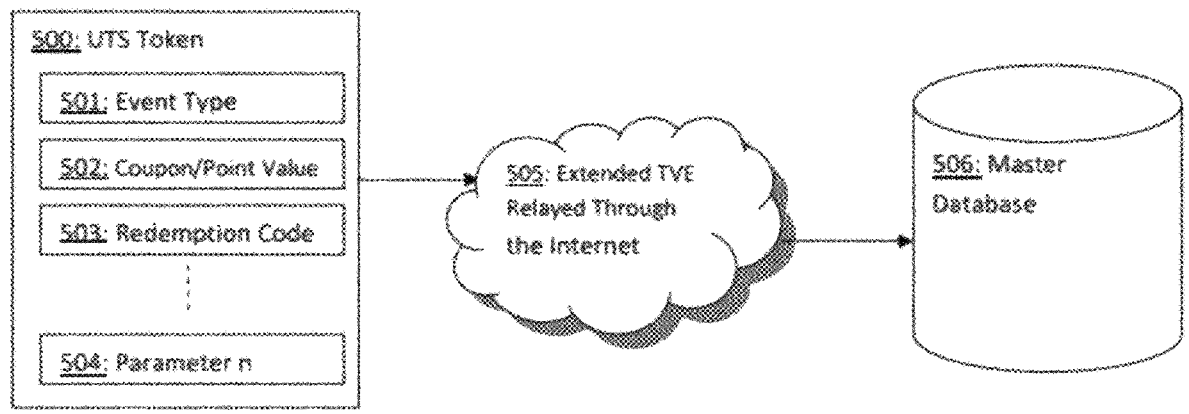
FIG. 5 is a schematic block diagram illustrating another embodiment of a token event in accordance with the present subject matter.

FIG. 5 depicts one embodiment of an extended TVE 500. Although a TVE, in one embodiment, may consist of only the basic information described above, a TVE may also contain additional data that may be necessary to more accurately describe an event. In one embodiment, this data may consist of an event type 501, such as a purchase, visit, coupon, redemption, product interest, delivery confirmation, and the like, identifiers 502 containing the value of a coupon, points, award, redemption, verification, and the like, a specific code 503 further identifying a particular redemption, or any number of other parameters 504. All TVE's, extended or otherwise, may be routed through the internet 505 to a centralized master database 506 to be stored for later processing.

Figure 6:
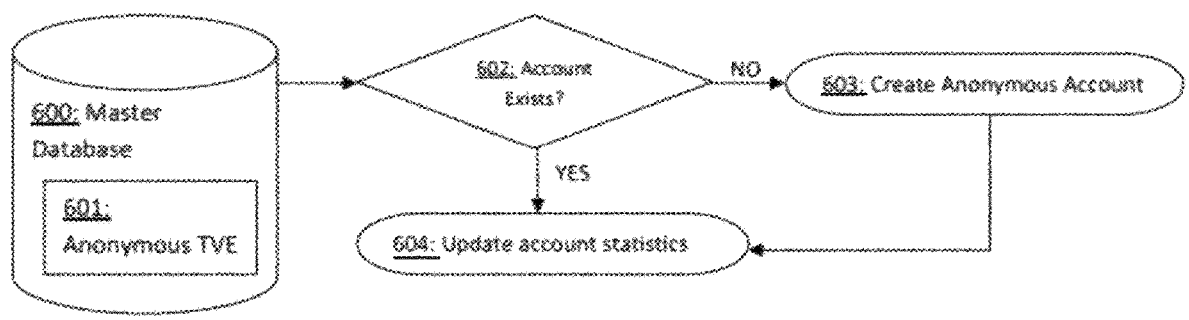
FIG. 6 is a schematic block diagram illustrating another embodiment of a tracker token in accordance with the present subject matter.

FIG. 6 depicts one embodiment of an anonymous account that may be created 603 when an anonymous TVE 601 occurs. Tokens in the tracking process are designed to work anonymously, meaning the mere presence of a valid token is all that is needed to begin the tracking process. When the presence of a token is determined, an anonymous TVE 601 is created. The master database management system 600 then checks whether an account exists in the database associated with the token. If an account does exist, then that account's statistics are updated 604. Otherwise, an anonymous user account is created 603 by the user account module 360 for that token and its statistics are updated 604. Alternatively, in one embodiment, an empty account may be created by the user account module 360 at any point during a relationship between a Trackor and Trackee. The empty account, in certain embodiments, may be further defined as the relationship continues and a user adds preference to the account.

Figure 7:
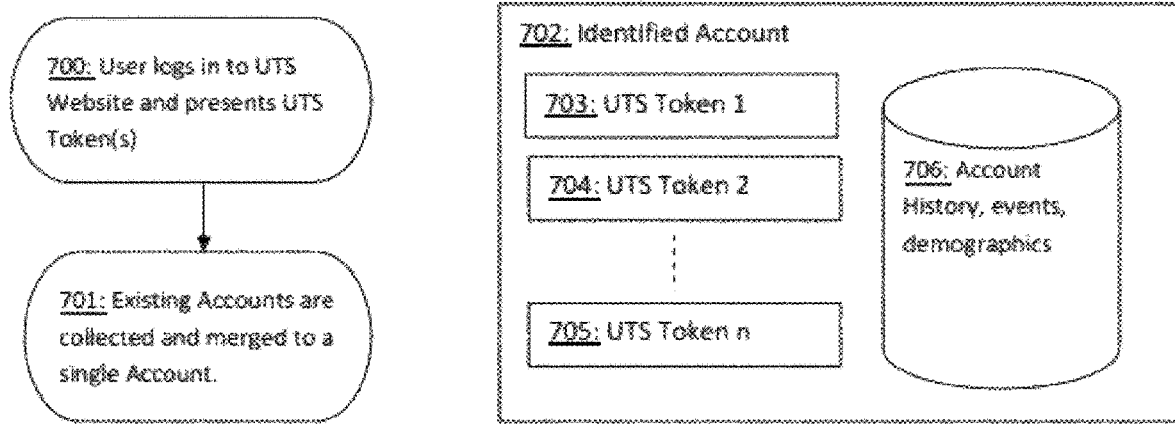
FIG. 7 is a schematic block diagram illustrating one embodiment of an account descriptor in accordance with the present subject matter.

FIG. 7 depicts an example of a user logging into the UTS website 700. In one embodiment, the user presents to the system one or more UTS tokens that they may have used 700. In some embodiments, any account information and statistics that may not have been previously linked to a user profile may be merged into a new account 701 created by the user account module 360. The new account 702 ensures that there is only one collector for the one or more tokens 703, 704, 705. In one embodiment, any new events associated with the one or more tokens 703, 704, 705 are accumulated, tracked, and stored in a database 706 such that it appears the data originated from the same token. In some embodiments, however, the token descriptor is maintained for certain functions.

In one embodiment, the tokens 703, 704, 705 may be removed from the account 702 without losing transactional data because the account itself collects the transactional data for a specific collection of tokens. Similarly, in other embodiments, new tokens may be added to the account 702 in order to duplicate the functionality of the removed tokens. In certain embodiments, this may provide a number of desirable features. First, in one embodiment, it may preserve data in the event that a token is lost because a token may be easily removed and replaced with a new token. Second, in another embodiment, it provides a layer of security because the token is merely an identifier for an account and does not contain any sensitive data. Finally, in other embodiments, it provides a level of redundancy as several different tokens may be used to accomplish the same tracking history. For example, a car token, a purse token, and a set of family tokens may all be used to collect and maintain a collective tracking history in the same account. In further embodiments, the collective data may be isolated to a specific token, if needed.

Figure 8:
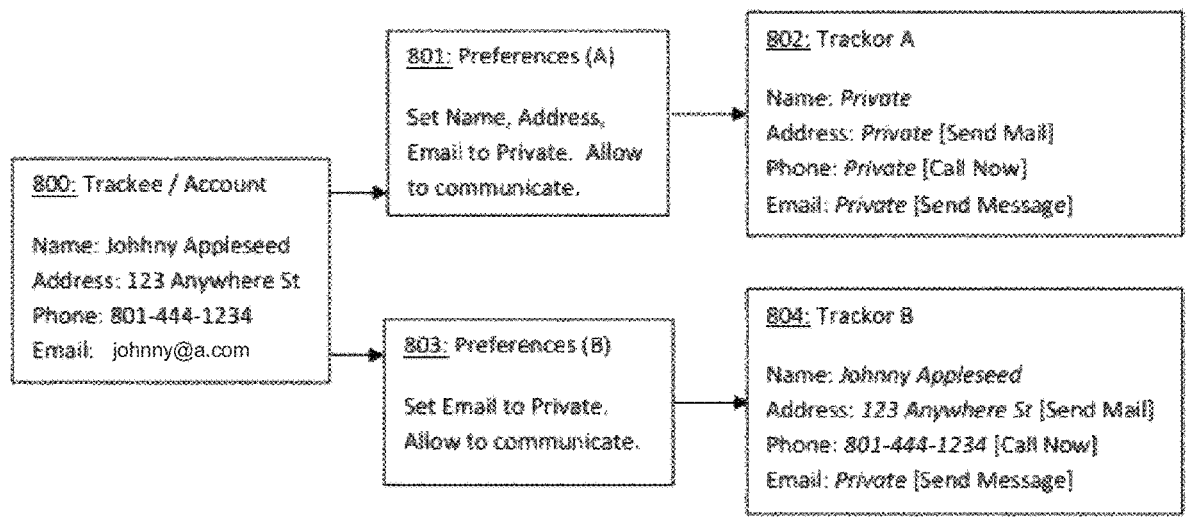
FIG. 8 is a schematic block diagram illustrating one embodiment of an account in accordance with the present subject matter.

FIG. 8 depicts one embodiment of setting Trackor preferences for one or more Trackors 802, 804 using the settings module 390. As shown in the depicted embodiment, Trackor A 802 is blocked from accessing or viewing the identity of the Trackee 800 because the Trackee has specified in Trackor A's preferences 801 that the name, address, and email address should not be viewable. On the other hand, Trackor B 804 is allowed to view the identity information of the Trackee, with the exception of the email address, because the Trackee has specified in Trackor B's preferences that only the email address should be kept private. In other embodiments, even though certain elements may be set to private, the preferences 801, 803 still allow communication through masked services, such as a redirected telephone call or a redirected email message from an email address that is defined and understood by the UTS system only. In one embodiment, the masked communication service may provide an inherit SPAM control function, where incoming messages, such as email, text, and the like, may be verified against a known sender list, unknown senders being filtered-out and their messages discarded.

Figure 9:
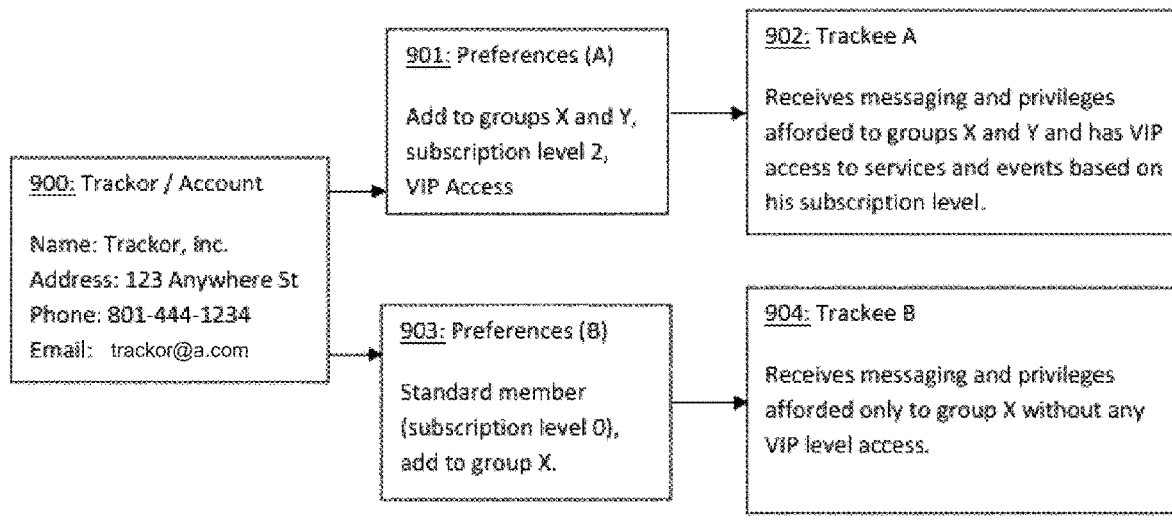
FIG. 9 is a schematic block diagram illustrating another embodiment of an account in accordance with the present subject matter.

FIG. 9 depicts another embodiment of setting Trackor preferences for one or more Trackors 902, 904 using the settings module 390. In one embodiment, both Trackors and Trackees are defined by a single account descriptor each with various preferences and features. Therefore, any account may be further modified to act as either a Trackor account or a Trackee account. As shown in the depicted embodiment, Trackor 900 may set different preferences 901, 903 associated with different Trackees 902, 904. The preferences 901, 903, in one embodiment, determine the communication and the access levels the Trackees 902, 904 have with the Trackor 900. Therefore, in one embodiment, a simple query against the preference settings can quickly determine whether or not to grant access to a given UTS token holder. In yet another embodiment, a query against a collection of Trackees may collect Trackee accounts for various purposes, such as demographic studies, group messaging, and the like.

Figure 10:
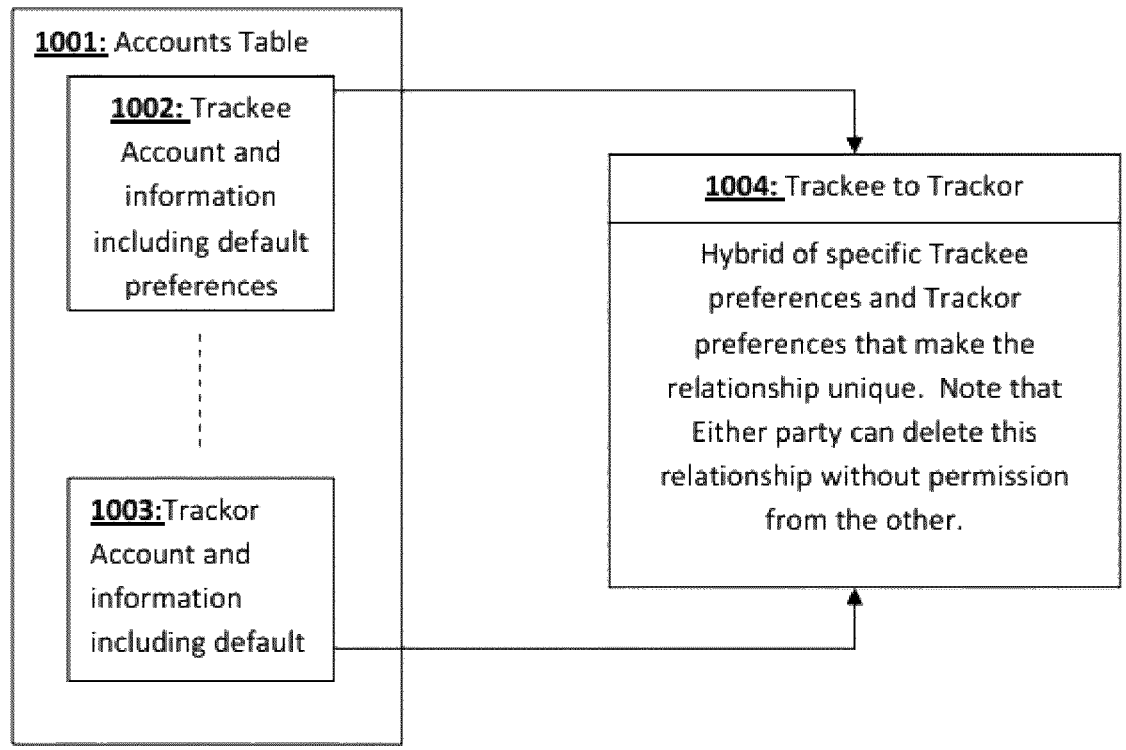
FIG. 10 is a schematic block diagram illustrating one embodiment of a relationship between accounts in accordance with the present subject matter.

FIG. 10 depicts one embodiment of a relationship between two or more accounts. An accounts table 1001, in one embodiment, may contain two or more account descriptors, each of which may be either a Trackee account or Trackor account. A Trackee account 1002 may be linked to a Trackor account 1003 through a relationship 1004. The relationship may be defined by a set of preferences that describe the behavior, privileges, level of access, user activity, history of visits, and the like, that exists between the two accounts. In one embodiment, the relationship may only be created with the mutual assent of the two parties and either party, at any time, may completely remove the account as easily as it was created.

Figure 11:
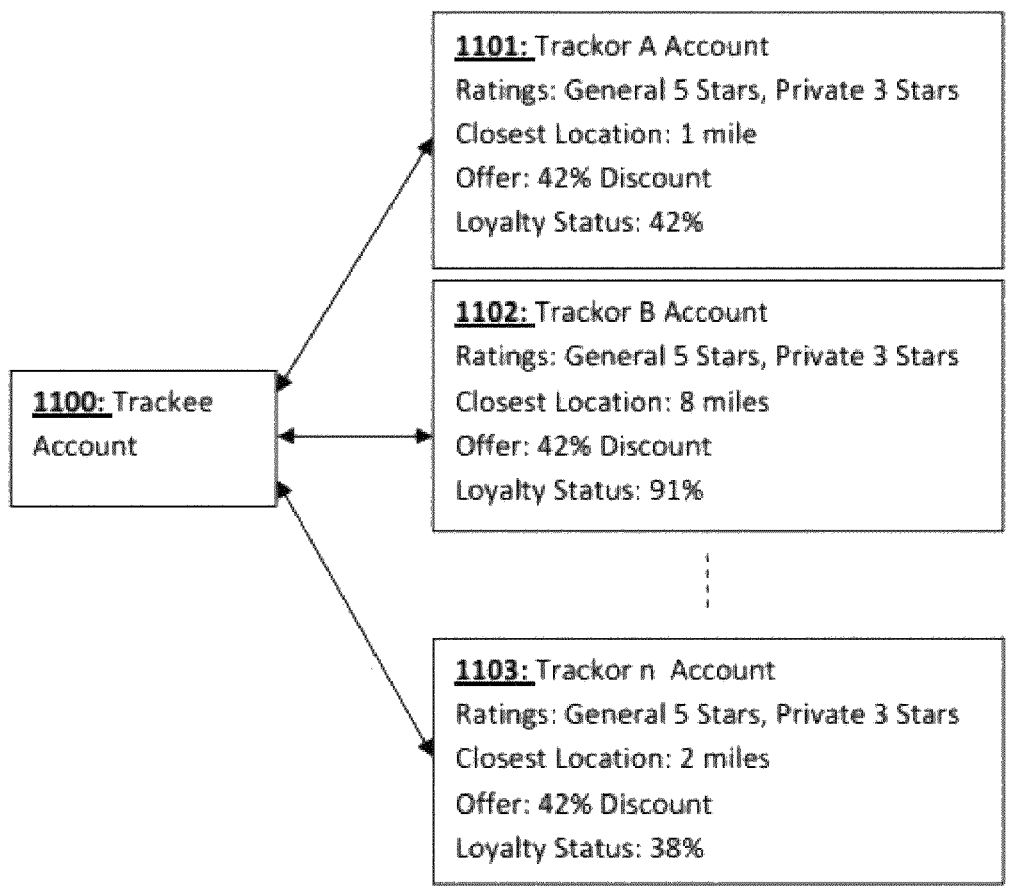
FIG. 11 is a schematic block diagram illustrating one embodiment of a Trackee account directory listing in accordance with the present subject matter.

FIG. 11 depicts one embodiment of a single Trackee account 1100 using special directory listing features to prioritize its favorite Trackor accounts 1101, 1102, 1103 based on various preference settings described in the relationship between the two accounts. For example, a Trackee account 1100 may sort any number of its preferred Trackors 1101, 1102, 1103 according to the closest location, different offers, loyalty status, and the like.

Figure 12:
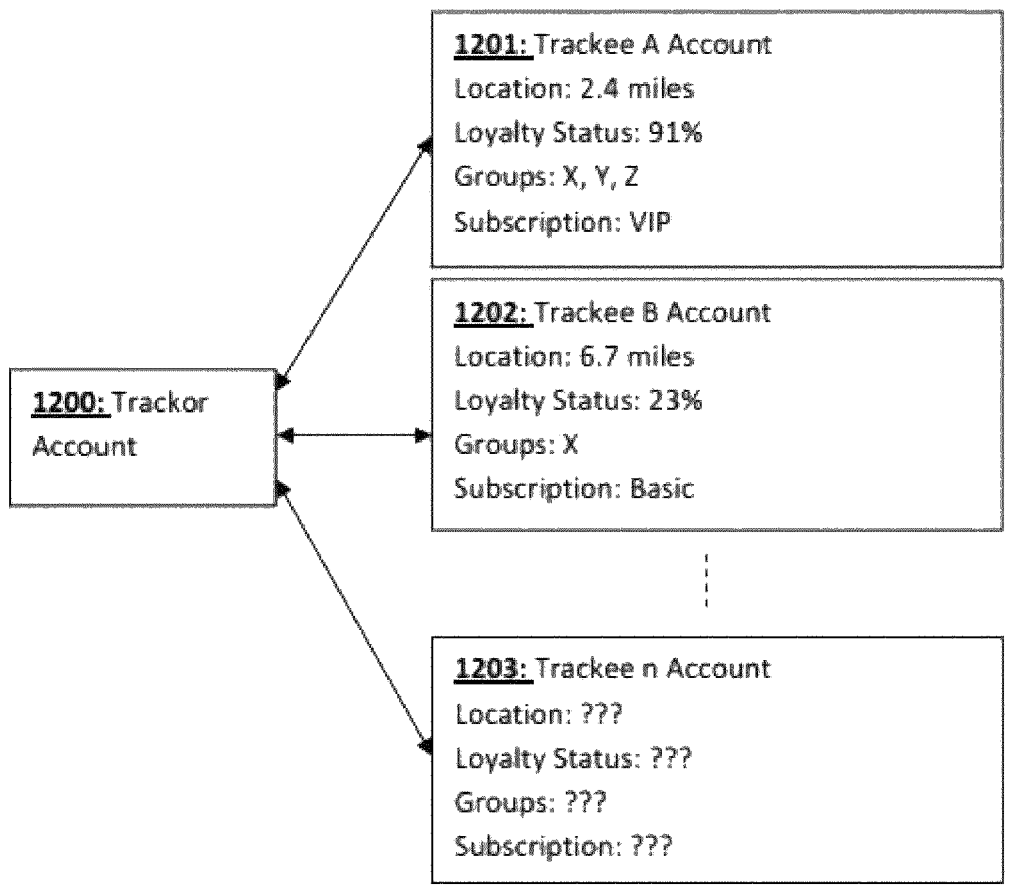
FIG. 12 is a schematic block diagram illustrating one embodiment of a Trackor account directory listing in accordance with the present subject matter.

Alternatively, FIG. 12 depicts one embodiment of a single Trackor account 1200 using special directory listing features to prioritize its favorite Trackee accounts 1201, 1202, 1203 based on various preference settings described in the relationship between the two accounts. Typically, however, these features may be of more interest to a Trackor than a Trackee. A Trackor account 1200, in one embodiment, may sort any number of its preferred Trackees 1201, 1202, 1203 according to factors such as distance, loyalty status, grouping, subscription level, and the like.

Figure 13:
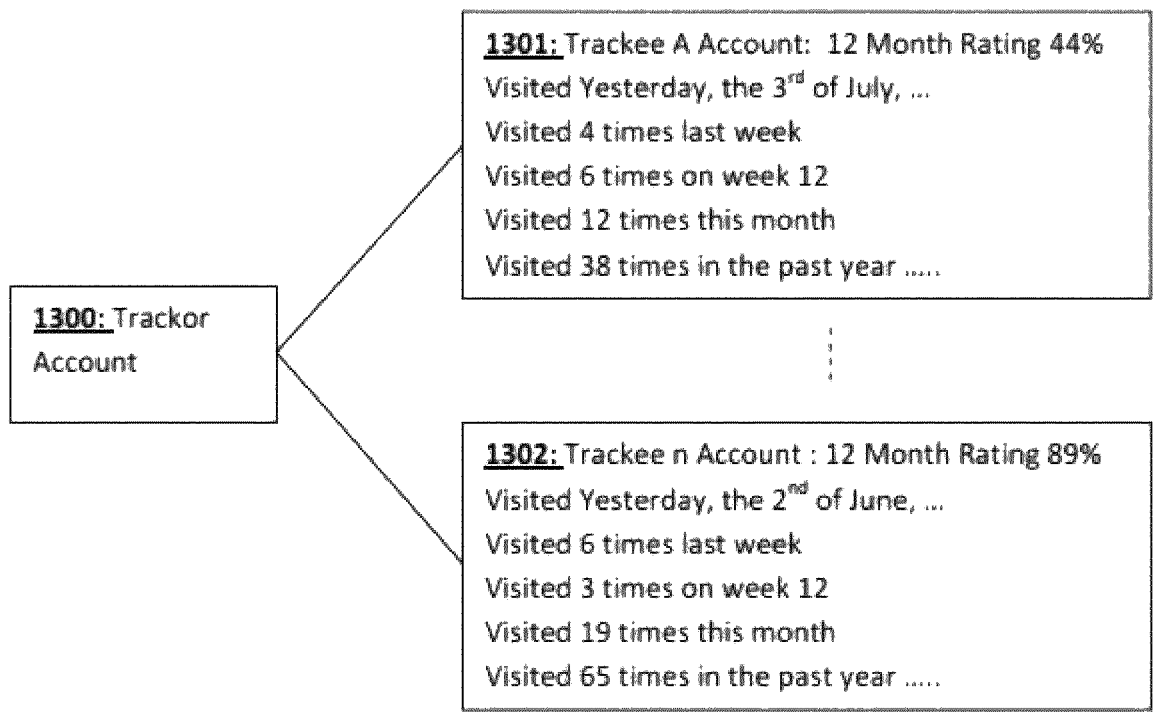
FIG. 13 is a schematic block diagram illustrating one embodiment of a loyalty status indicator in accordance with the present subject matter.

FIG. 13 depicts one embodiment of a listing of various loyalty status indicators associated with a Trackee account 1301, 1302 based upon a Trackee's recorded activity. A Trackor 1300 may have access to these indicators, known collectively as a visit history from the minimal values present in TVEs, as discussed with reference to FIG. 4 above. In one embodiment, this feature may provide a given Trackor the ability to rank and segment its Trackees according to how often they are present at any number of its locations.

Figure 14:
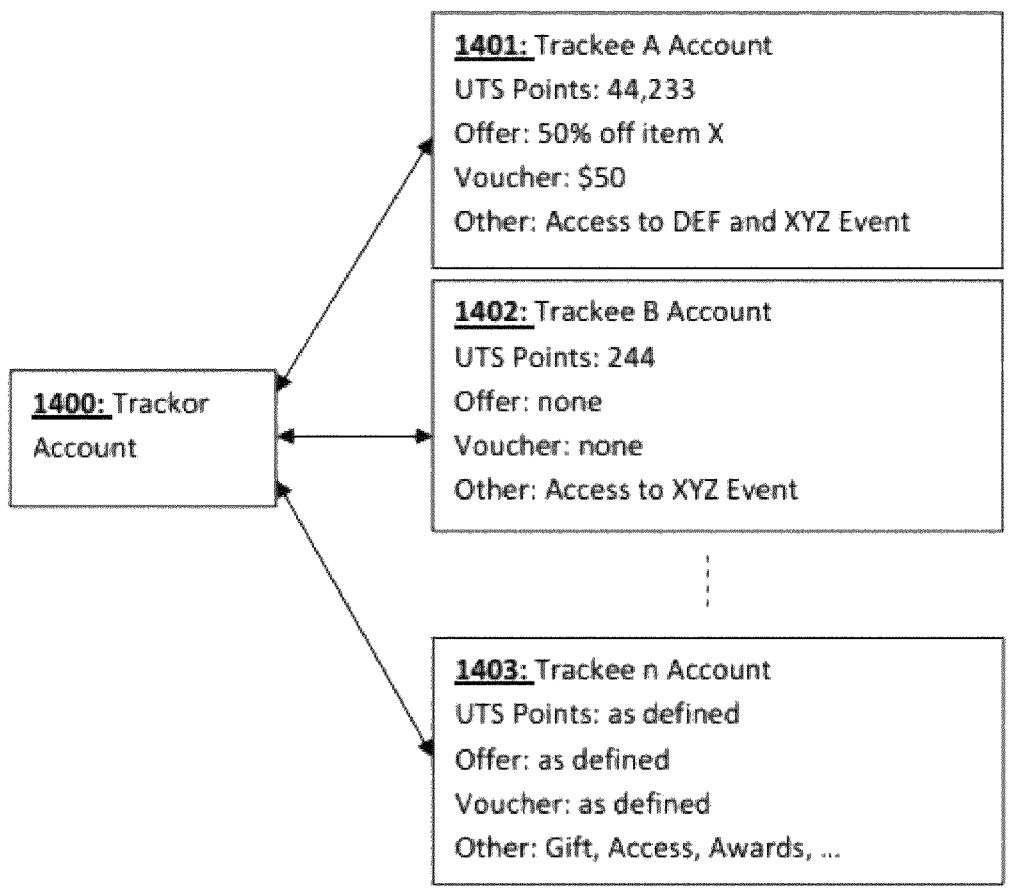
FIG. 14 is a schematic block diagram illustrating one embodiment of an account value assignment in accordance with the present subject matter.

FIG. 14 depicts one embodiment of a value assignment feature whereby a given Trackor 1400 may assign a benefit or value to one or more Trackee accounts, or a group of Trackee accounts. As the UTS is used, over time the Trackor 1400 may issue various awards to one or more of its Trackee accounts 1401, 1402, 1403. With the exception of the UTS point system, described below, in certain embodiments the awards may become a part of a Trackee's account record and may be utilized as the Trackor 1400 has previously defined.

Figure 15:
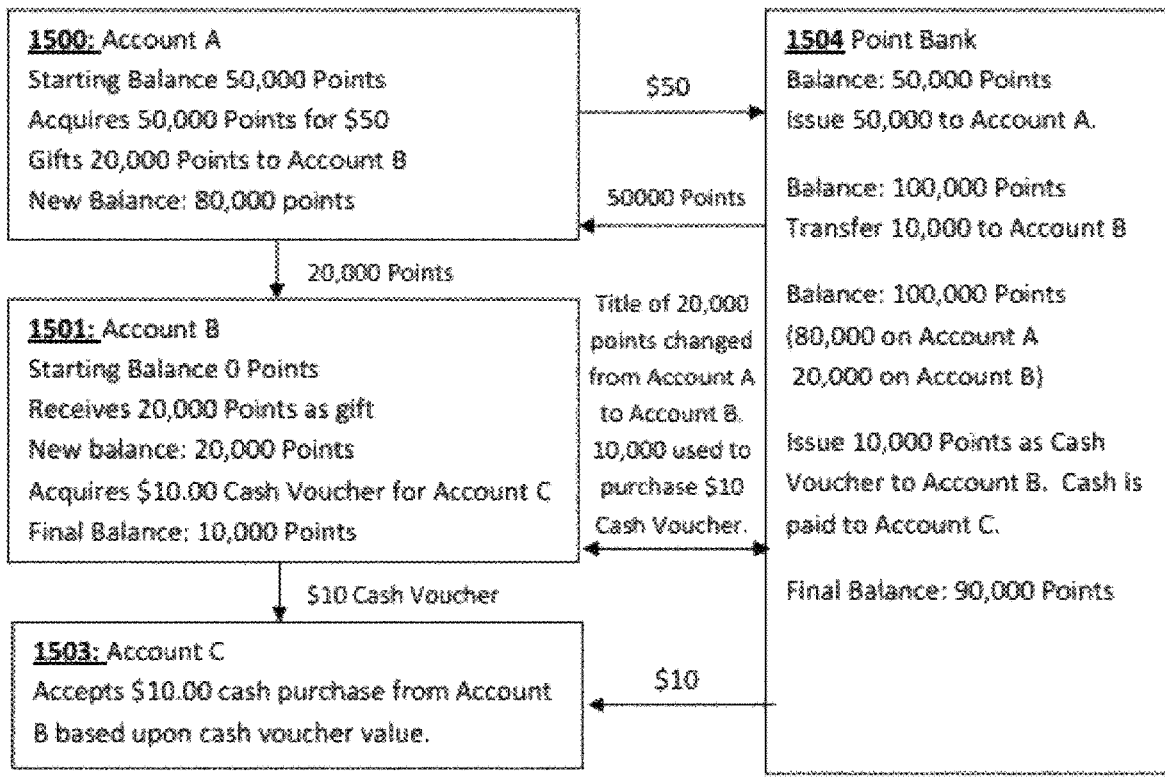
FIG. 15 is a schematic block diagram illustrating one embodiment of a point accounting system in accordance with the present subject matter.

FIG. 15 depicts one embodiment of the UTS point mechanism created by the points module 375, which may be a universal point exchange system defined within the UTS. The UTS point system, in one embodiment, may begin with an arbitrarily defined case value for each point. Any account 1500, 1501, 1503 may acquire UTS points, in some embodiments, by direct purchases, gifts, awards, and/or exchanges from another UTS account. For example, account A 1500 may directly purchase 50,000 points from the point bank 1504, which tallies and manages all point balances as an accounting ledger system. Account A 1500 may then assign or gift points to any other account, such as Account B 1501. Account B 1501 may then redeem points for a cash voucher, which is valid to use specifically at Account C 1503.

The points module 375, in one embodiment, may be configured to aggregate and manage a Trackee's loyalty points, which may be acquired through transacting with Trackors or other parties and are redeemable at a number of merchants. The points module 375, in another embodiment, may maintain a barter system where users may exchange loyalty points for goods, services, or the like. The loyalty points, in another embodiment, may be globally accessible and redeemable. The points module 375, in one embodiment, acts as a virtual "currency exchange system," which facilitates the universal nature of the tracking system and may work in tandem with the cashless processing module 380 described below.

In another embodiment, the system may facilitate the exchange and assignment of tickets, coupons, vouchers, or the like. For example, a user that has two tickets to a concert may gift and assign one of the tickets to a friend. The authorization of the gift may be done on a mobile device, the UTS website, or the like. In a further embodiment, a user may scan their tracking token at a terminal at a sporting event, concert event, or the like, to receive coupons, vouchers, or the like that are automatically linked to their user account. This may provide the user with an incentive to scan at the terminal, which, in turn, collects valuable user data.

Figure 16:
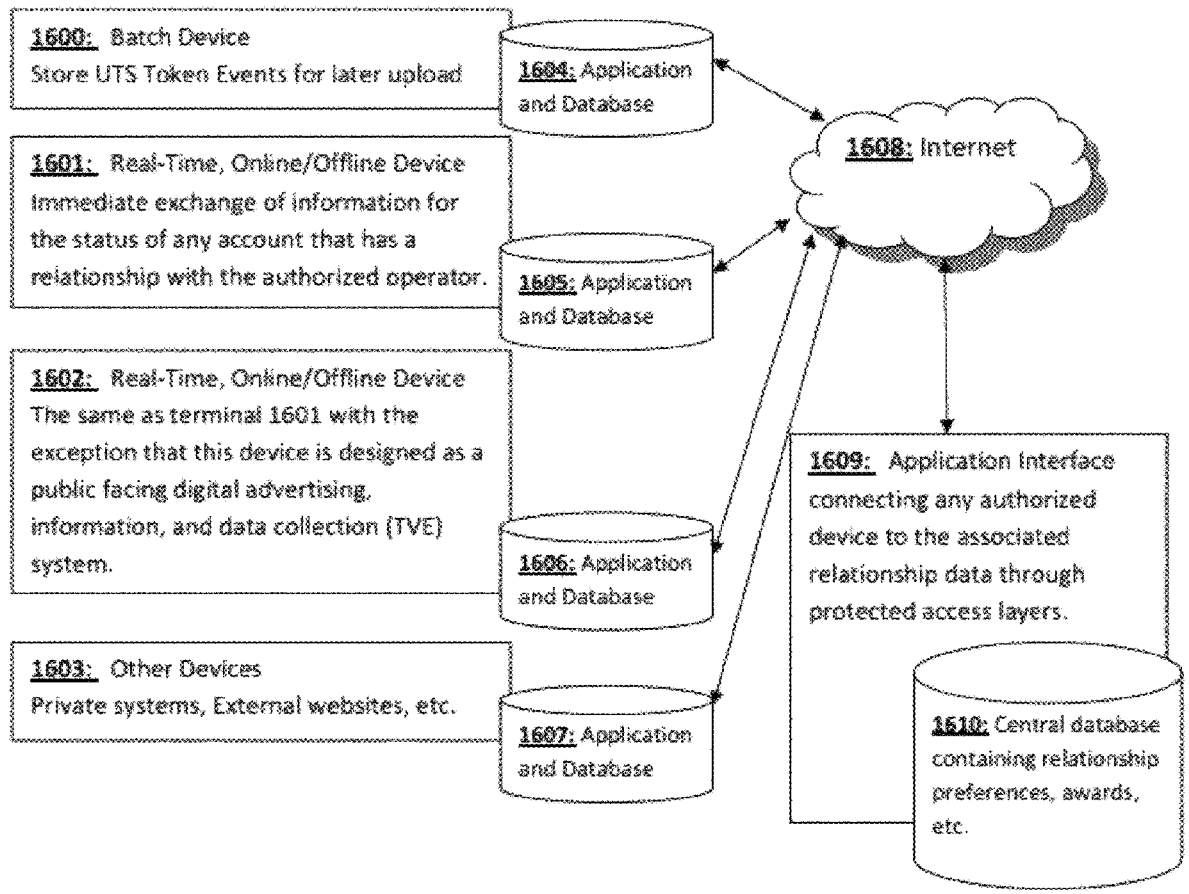
FIG. 16 is a schematic block diagram illustrating one embodiment of a tracking system in accordance with the present subject matter.

FIG. 16 depicts one embodiment of a universal tracking system. As shown, one or more devices 1600, 1601, 1602, 1603 may use an associated intermediate localized database application 1604, 1605, 1606, 1607 to connect to a master application interface 1609 through a network such as the internet 1608. The devices 1600, 1601, 1602, 1603, through the master application interface 1609 may access a central database 1610, in some embodiments, to inquire about account status, awards, vouchers, UTS points, record TVEs, and/or other relationship-based data. In one embodiment, the Trackee may present its UTS token to request such an action and the Trackor account may read the status of the relationship.

In one embodiment, the localized intermediate database design may store a majority of the information that would normally require a query into the centralized database 1610. Because a query into the centralized database 1610 is not necessary, speed and efficiency may be increased by a local database lookup, giving the appearance of a real-time transaction. In one embodiment, any associated changes and/or updates may be stored in the local database 1604, 1605, 1606, 1607 and may be transferred at a later time to the central database 1610 through the master application interface 1609, depending on the reliability of the connection 1608 between the two database systems. In other embodiments, the exchange of critical data, such as currency, points, awards, and the like, may require an active and reliable connection 1608 to immediately validate the transactions.

Figure 17:
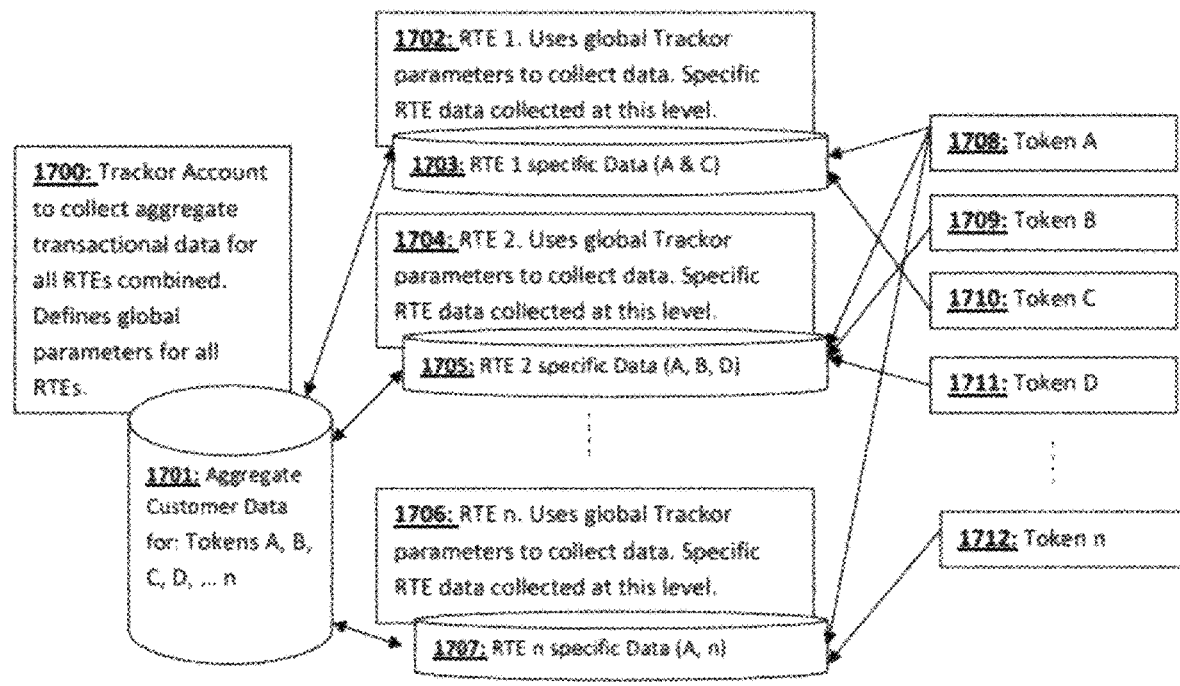
FIG. 17 is a schematic block diagram illustrating another embodiment of a tracking system in accordance with the present subject matter.

FIG. 17 depicts one embodiment of a related tracker entity ("RTE"), which may include a group of Trackor accounts. In some embodiments, there may be two types of RTEs: the parent RTE 1700 and one or more children RTE 1702, 1704, 1706. In one embodiment, at least one parent RTE 1700 may exist for any given Trackor. The parent RTE may be used, in one embodiment, to set the processing model and define global parameters for how to handle token events for its children. As token events 1708, 1709, 1710, 1711, 1712 occur, in other embodiments, specific data, including account lists and token activity, may be collected at both the child RTE level 1703, 1705, 1707, and the parent RTE level 1701, which may simply be an aggregation of all child RTE activity.

For example, the parent RTE may be a corporation that defines a loyalty program, including the terms and advertising campaigns, for the entire organization. All children RTEs would inherit the parent RTE defined loyalty program. In this way, the RTE program may provide a consistent loyalty program across a large organization while making it easy to quickly and effectively alter the loyalty program across the entirety of the corporation.

Figure 18:
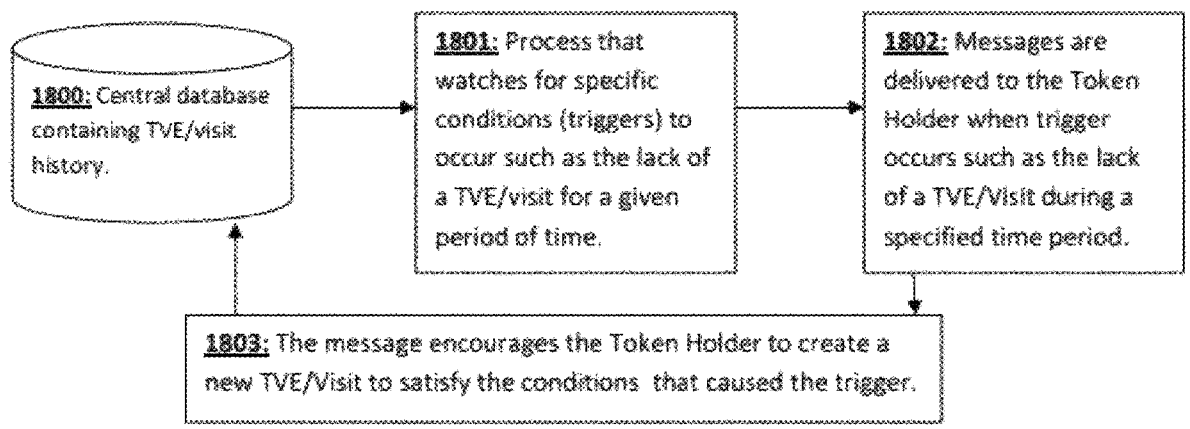
FIG. 18 is a schematic block diagram illustrating one embodiment of a message generation system in accordance with the present subject matter.

FIG. 18 depicts one embodiment of a Trackee retention process 1801 governed by the token visit even module 370. The process 1801 monitors a central database 1800 for certain triggers, such as the lack of a TVE over a given period of time. When such a trigger is fired, in one embodiment, the system may automatically take various actions, such as send a Trackee a message, offer, coupon, or the like to persuade the Trackee to visit the Trackor again. As shown in the depicted embodiment, for example, a message may be delivered 1802 to a Trackee, which directs 1803 the Trackee to visit the Trackor again, creating a new TVE in the process, to resolve the condition that fired the trigger.

Figure 19A:
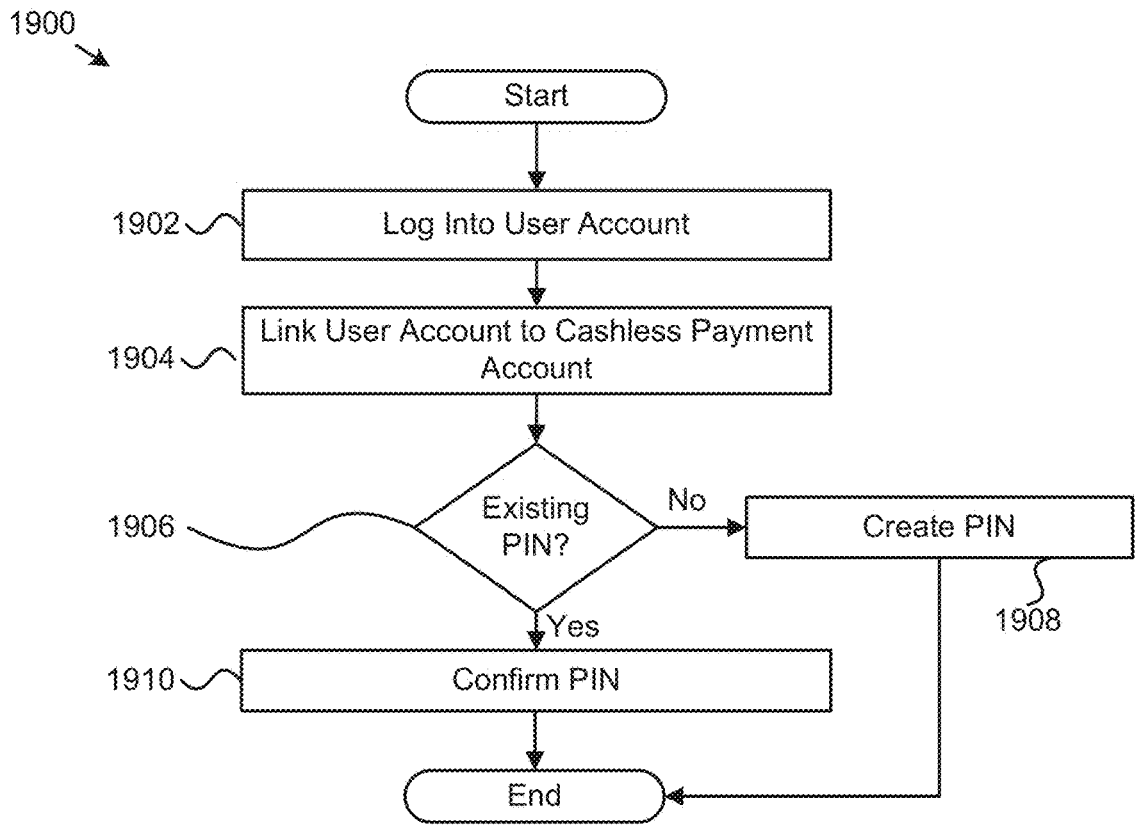
FIG. 19A is a schematic flow chart diagram illustrating one embodiment of a cashless processing system in accordance with the present subject matter.

FIG. 19A is a schematic flow chart diagram illustrating one embodiment of a method 1900 for cashless transaction processing using the UTS. The method 1900 begins and a Trackee logs 1902 into their user account using the UTS website, a separate mobile application, or the like. The Trackee links 1904 their user account to a cashless payment account, such as a credit card or deposit account. The system checks 1906 for an existing PIN for the cashless account. If a PIN does not exist for the cashless account, the Trackee is prompted to create 1908. Otherwise, the Trackee enters their existing PIN to authorize and confirm 1910 cashless transactions with a Trackor. The method 1900 ends.

Figure 19B:
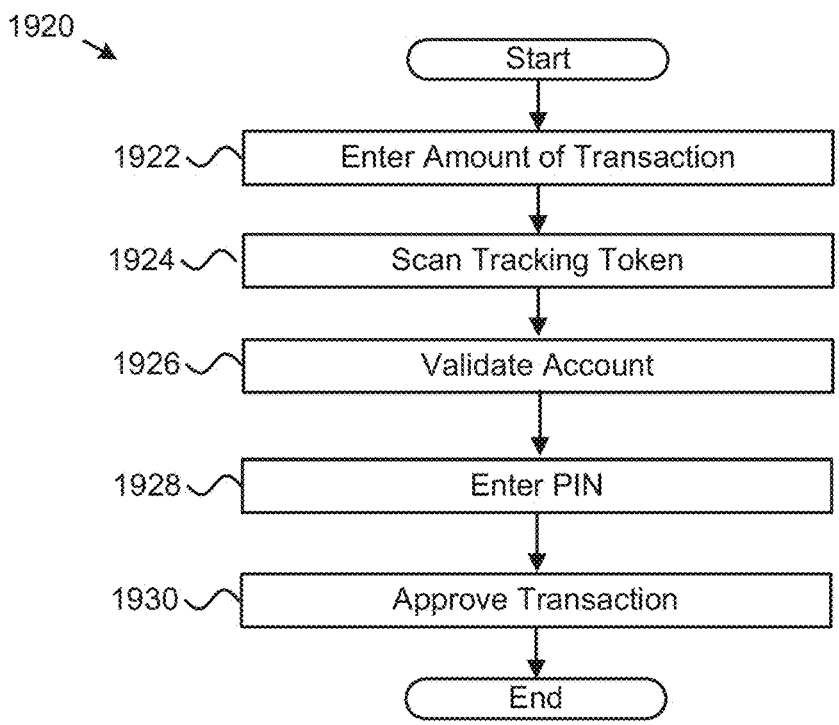
FIG. 19B is a schematic flow chart diagram illustrating one embodiment of a cashless processing system in accordance with the present subject matter.

FIG. 19B is a schematic flow chart diagram illustrating one embodiment of a method 1920 for cashless transaction processing using the UTS. The method 1920 begins and a Trackor enters 1922 the amount of the transaction on a terminal, such as a tablet computer, smart phone, PDA device or the like, and scans 1924 the Trackee's tracking token. The cashless processing module 380 validates 1926 the Trackee's account by requiring the Trackee to enter 1928 their cashless account PIN to approve 1930 the transaction. The method 1900 ends.

Figure 20:
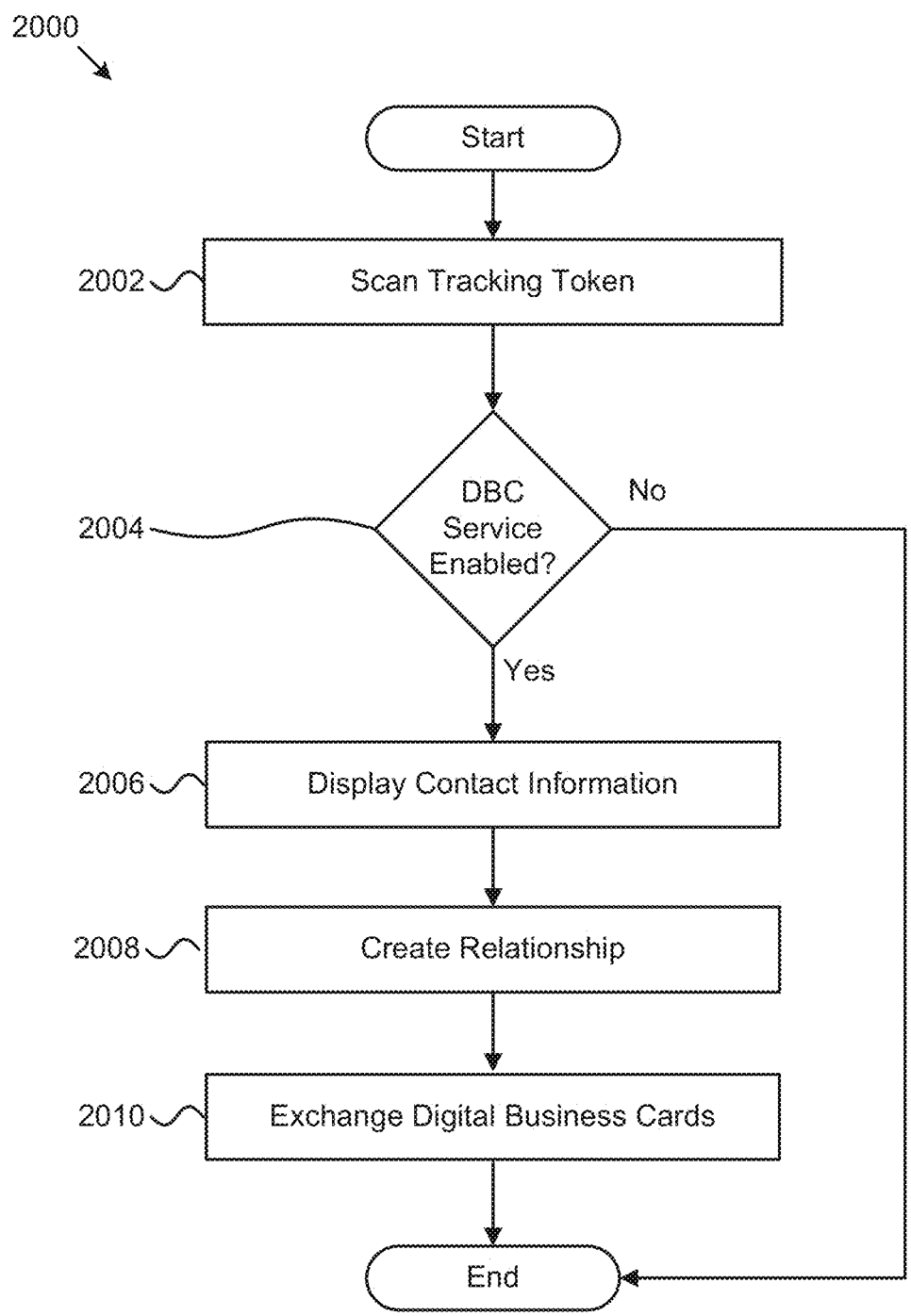
FIG. 20 is a schematic flow chart diagram illustrating one embodiment of a digital business card system in accordance with the present subject matter.

FIG. 20 is a schematic flow chart diagram illustrating one embodiment of a method 2000 for a digital business card system using the UTS. The method 2000 begins and a Trackee tracking token is scanned 2002 and the digital business card module 385 checks whether the Trackee has enabled 2004 the digital business card service of the UTS. If not, the method 2000 ends. Otherwise, the Trackee contact information is displayed 2006 on an electronic display device, such as a tablet computer, smart phone, or the like. The digital business card module 385 may also create a relationship 2008 between the Trackor and Trackee. Digital business cards are automatically exchanged 2010. Other digital objects may also be exchanged, in one embodiment, such as notes, groups, and/or the like. The method 2000 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   create a universal tracking token, the universal tracking token comprising a digital tracking identifier associated with a user such that the user's activities at a merchant can be digitally tracked by the merchant, the universal tracking token having a unique identifier associated with the user;
   encode the universal tracking token in a predefined identification format;
   create a tracking account for the universal tracking token in a central database, the tracking account comprising tracking data for an anonymous user until a user account is linked to the tracking account;
   provide the universal tracking token in a form that can be scanned using a scanner, the form comprising a bar code, the scanner storing information associated with the universal tracking token in a local database when the universal tracking token is scanned and transmit the information to the central database over a network so that the information can be associated with the tracking account;
   create the user account associated with the tracking account in the central database;
   link the user account to the tracking account for the universal tracking token so that the tracking account is no longer associated with the anonymous user;
   maintain a one-to-many relationship between the user account and a plurality of merchant accounts, wherein account information associated with the user is accessible to the user and each of the merchants that has a relationship with the user;
   record a token visit event data associated with the merchant to a visit history of the user account in the central database in response to the universal tracking token being detected at the merchant without requiring the user to complete a transaction at the merchant using the universal tracking token, wherein the token visit event data that is recorded within a predefined period of time of a previous detection of the universal tracking token is discarded;
   associate one or more loyalty points provided by the merchant with the user's tracking account in response to the user completing the transaction with the user;
   aggregate the one or more loyalty points with the one or more previously acquired loyalty points from the one or more different merchants;
   make the aggregated loyalty points globally redeemable at a plurality of merchants, the plurality of merchants including the merchants where the loyalty points are earned and the merchants where the loyalty points have not been earned; and
   monitor the central database for the token visit event data at the merchant associated with the user's tracking account;
   determine that the user's universal tracking token has not been detected over a given period of time at the merchant; and trigger a retention action for the user from the merchant, the retention action intended to persuade the user to visit the merchant, wherein the universal tracking token is created without receiving any prerequisites from the user, provides a two-sided, opt-in relationship between the user and the merchant, provides data describing the relationship between the user and the merchant, and allows the user to control privacy settings defining the relationship between the user and the merchant.

2. The apparatus of claim 1, wherein the code is further executable to detect the presence of a universal tracking token during a transaction between a key holder and a merchant, wherein visit history data associated with the merchant is updated with one or more of the time of the transaction and the key holder information.

3. The apparatus of claim 1, wherein the code is further executable to maintain user account access preferences for one or more of merchant and key holder accounts such that one or more parties in a relationship may hide information from other parties.

4. The apparatus of claim 3, wherein the code is further executable to provide communications through masked services, the masked services redirecting communication through channels only defined and understood by the tracking system, wherein the masked services verify communications with a known sender list such that communications from unknown senders are filtered-out and discarded.

5. The apparatus of claim 1, wherein the code is further executable to maintain a personal relationship directory such that a key holder may view a listing of their favorite merchants, a merchant being added to the directory when a key holder presents their tracking token at the merchant.

6. The apparatus of claim 1, wherein the code is further executable to aggregate and report general relationship data regardless the privacy settings of either party, and manage shared relationship data, the shared relationship data being viewable by both parties in a relationship with access limitations defined by the parties' privacy settings.

7. The apparatus of claim 1, wherein each party in a relationship has equal control over the duration and terms of the relationship such that a merchant and a key holder may end the relationship at any time.

8. The apparatus of claim 1, wherein the tracking identifier is stored in a compressed format comprising a class identifier, an encrypted numerical value, and an alphanumeric verification character such that tracking capabilities are limited to users authorized with a tracking identifier.

9. The apparatus of claim 1, wherein the code is further executable to create an empty tracking account, the empty tracking account being further defined as transaction activity occurs in the relationship between the merchant and key holder.

10. The apparatus of claim 1, wherein the code is further executable to create an anonymous tracking account when an anonymous token visit event occurs, the anonymous tracking account being subsequently assigned to a key holder when the key holder registers for the account.

11. The apparatus of claim 1, wherein the code is further executable to link a cashless payment account with a user account, the cashless payment being accepted at a plurality of merchants for one or more of goods and services, the authorization of the cashless payment confirmed by entering a PIN.

12. The apparatus of claim 1, wherein the code is further executable to associate business contact information with a user account, the business contact information retrievable by presenting a tracking token to an interested party, wherein a relationship between the parties may be created when the information is retrieved.

13. The apparatus of claim 12, wherein the privacy settings and access levels of the user account may be overridden by the user at the time the business contact information is requested such that a user may control how much information to share with the other party.

14. The apparatus of claim 1, wherein the code is further executable to visually present dynamic, interactive advertising on a point-of-sale terminal, wherein the interactive advertising content is based on one or more of advertising campaigns and schedules, the point-of-sale terminals being classified and managed in user-definable groups.

15. The apparatus of claim 14, wherein the point-of-sale terminal collects user data, the collected data being stored in a local database until it is later transmitted to a central database through a network.

16. The apparatus of claim 1, wherein merchant accounts may be classified as one or more of a parent and child account, a parent account governing at least one child account such that certain settings of the at least one child account are determined by the parent account.

17. A method comprising the steps of:
creating a universal tracking token, the universal tracking token comprising a digital tracking identifier associated with a user such that the user's activities at a merchant can be digitally tracked by the merchant, the universal tracking token having a unique identifier associated with the user;
encoding the universal tracking token in a predefined identification format;
creating a tracking account for the universal tracking token in a central database, the tracking account comprising tracking data for an anonymous user until a user account is linked to the tracking account;
providing the universal tracking token in a form that can be scanned using a scanner, the form comprising a bar code, the scanner storing information associated with the universal tracking token in a local database when the universal tracking token is scanned and transmitting the information to the central database over a network so that the information can be associated with the tracking account;
creating the user account associated with the tracking account in the central database;
linking the user account to the tracking account for the universal tracking token so that the tracking account is no longer associated with the anonymous user;
maintaining a one-to-many relationship between the user account and the plurality of merchant accounts, wherein account information associated with the user is accessible to the user and each of the merchants that has a relationship with the user;
scanning the universal tracking token at the merchant in response to the universal tracking token being presented at the merchant;
recording a token visit event data associated with the merchant to a visit history of the user account in the central database in response to the universal tracking token being detected at the merchant without requiring the user to complete a transaction at the merchant using the universal tracking token, wherein the token visit event data that is recorded within a predefined period of time of a previous scan detection of the universal tracking token is discarded;

associating one or more loyalty points provided by the merchant with the user's tracking account in response to the user completing the transaction with the user;

aggregating the one or more loyalty points with the one or more previously acquired loyalty points from the one or more different merchants;

making the aggregated loyalty points globally redeemable at the plurality of merchants, the plurality of merchants including the merchants where the loyalty points are earned and merchants where the loyalty points have not been earned;

monitoring the central database for the token visit event data at the merchant associated with the user's tracking account;

determining that the user's universal tracking token has not been detected over a given period of time at the merchant; and triggering a retention action for the user from the merchant, the retention action intended to persuade the user to visit the merchant, wherein the universal tracking token is created without receiving any prerequisites from the user, provides a two-sided, opt-in relationship between the user and the merchant, provides data describing the relationship between the user and the merchant, and allows the user to control privacy settings defining the relationship between the user and the merchant.

18. The method of claim 17, further comprising detecting the presence of a universal tracking token during a transaction between a key holder and a merchant, wherein visit history data associated with a merchant is updated with one or more of the time of the transaction and the key holder information.

19. The method of claim 17, further comprising providing communications through masked services, the masked services redirecting communication through channels only defined and understood by the tracking system, wherein the masked services verify communications with a known sender list such that communications from unknown senders are filtered-out and discarded.

20. The method of claim 17, further comprising linking a cashless payment account with a user account, the cashless payment being accepted at a plurality of merchants for one or more of goods and services, the authorization of the cashless payment confirmed by entering a PIN.

21. A computer program product comprising a non-transitory computer readable storage medium having computer readable program code embodied therewith, the computer readable program code configured to:

create a universal tracking token, the universal tracking token comprising a digital tracking identifier associated with a user such that the user's activities at a merchant can be digitally tracked by the merchant, the universal tracking token having a unique identifier associated with the user;

encode the universal tracking token in a predefined identification format; create a tracking account for the universal tracking token in a central database, the tracking account comprising tracking data for an anonymous user until a user account is linked to the tracking account;

provide the universal tracking token in a form that can be scanned using a scanner, the form comprising a bar code, the scanner storing information associated with the universal tracking token in a local database when the universal tracking token is scanned and transmit the information to the central database over a network so that the information can be associated with the tracking account;

create the user account associated with the tracking account in the central database;

link the user account to the tracking account for the universal tracking token so that the tracking account is no longer associated with the anonymous user;

maintain a one-to-many relationship between the user account and the plurality of merchant accounts, wherein account information associated with the user is accessible to the user and each of the merchants that has a relationship with the user;

record a token visit event data associated with the merchant to a visit history of the user account in the central database in response to the universal tracking token being detected at the merchant without requiring the user to complete a transaction at the merchant using the universal tracking token, wherein the token visit event data that is recorded within a predefined period of time of a previous detection of the universal tracking token is discarded;

associate one or more loyalty points provided by the merchant with the user's tracking account in response to the user completing the transaction with the user;

aggregate the one or more loyalty points with the one or more previously acquired loyalty points from the one or more different merchants;

make the aggregated loyalty points globally redeemable at the plurality of merchants, the plurality of merchants including merchants where the loyalty points are earned and the merchants where the loyalty points have not been earned;

monitor the central database for the token visit event data at the merchant associated with the user's tracking account;

determine that the user's universal tracking token has not been detected over a given period of time at the merchant; and trigger a retention action for the user from the merchant, the retention action intended to persuade the user to visit the merchant, wherein the universal tracking token is created without receiving any prerequisites from the user, provides a two-sided, opt-in relationship between the user and the merchant, provides data describing the relationship between the user and the merchant, and allows the user to control privacy settings defining the relationship between the user and the merchant.

22. The computer program product of claim 21, the computer readable program code further configured to detect the presence of a universal tracking token during a transaction between a key holder and a merchant, wherein visit history data associated with a merchant is updated with one or more of the time of the transaction and the key holder information.

23. The computer program product of claim 21, the computer readable program code further configured to provide communications through masked services, the masked services redirecting communication through channels only defined and understood by the tracking system, wherein the masked services verify communications with a known sender list such that communications from unknown senders are filtered-out and discarded.

24. The computer program product of claim 21, the computer readable program code further configured to link a cashless payment account with a user account, the cashless payment being accepted at a plurality of merchants for one or more of goods and services, the authorization of the cashless payment confirmed by entering a PIN.

* * * * *